(12) United States Patent
Govindarajan et al.

(10) Patent No.: US 12,216,934 B2
(45) Date of Patent: *Feb. 4, 2025

(54) HUB FOR MULTI-CHIP SENSOR INTERFACE SYSTEM AND REAL TIME ENVIROMENTAL CONTEXT MAPPER FOR SELF-DRIVING CARS

(71) Applicant: TEXAS INSTRUMENTS INCORPORATED, Dallas, TX (US)

(72) Inventors: Sriramakrishnan Govindarajan, Bangalore (IN); Mihir Mody, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/585,619

(22) Filed: Feb. 23, 2024

(65) Prior Publication Data
US 2024/0192884 A1 Jun. 13, 2024

Related U.S. Application Data

(63) Continuation of application No. 17/668,052, filed on Feb. 9, 2022, now Pat. No. 11,947,832.

(51) Int. Cl.
*G06F 3/00* (2006.01)
*G06F 3/06* (2006.01)
*G06F 13/28* (2006.01)

(52) U.S. Cl.
CPC .......... *G06F 3/0656* (2013.01); *G06F 3/0604* (2013.01); *G06F 3/0679* (2013.01); *G06F 13/28* (2013.01); *G06F 2213/28* (2013.01)

(58) Field of Classification Search
CPC .... G06F 3/0656; G06F 3/0604; G06F 3/0679; G06F 13/28
See application file for complete search history.

(56) References Cited

U.S. PATENT DOCUMENTS

| | | | |
|---|---|---|---|
| 8,683,100 B1* | 3/2014 | Wang | G06F 15/17325 710/45 |
| 11,216,055 B2 | 1/2022 | Lee et al. | |
| 11,947,832 B2* | 4/2024 | Govindarajan | G06F 3/0679 |
| 2017/0105095 A1 | 4/2017 | Um et al. | |
| 2023/0185364 A1 | 6/2023 | Nickerson | |

\* cited by examiner

*Primary Examiner* — Tammara R Peyton
(74) *Attorney, Agent, or Firm* — Michael T. Gabrik; Frank D. Cimino

(57) ABSTRACT

Various systems and circuits are provided. One such system includes input interfaces to receive items of input data of different types; output interfaces, each of a different type; an interconnect coupled to the input interfaces and to the output interfaces; and an multichip hub that includes buffers respectively corresponding to the types of input data, context memory blocks, and a data movement engine with a context mapper to determine a context of each item of input data received and provide the item of input data to a corresponding context memory block. Multiple processing blocks within the multichip hub are each configured to perform a respective processing operation. The data movement engine receives context configuration data to determine, for each item of input data received, which of the multiple processing operations are to be applied to the item of input data.

19 Claims, 6 Drawing Sheets

HUB FOR MULTI-CHIP SENSOR INTERFACE SYSTEM AND REAL TIME ENVIROMENTAL CONTEXT MAPPER FOR SELF-DRIVING CARS

CROSS-REFERENCE TO RELATED APPLICATION(S)

This application is a continuation of, and claims priority to, application Ser. No. 17/668,052, filed Feb. 9, 2022, the content of which is incorporated by reference herein.

BACKGROUND

As sensor quality increases, so does the amount of processing required to incorporate those sensors. By utilizing the increased sensor data, and improved processing, many technological feats may be achieved. One example of such progress is in autonomous vehicles. In self-driving cars, for example, many sensors are utilized. This can include a variety of sensors as well as multiple copies of a particular type of sensor. In light of the safety concerns related to self-driving cars, it is vital that the sensors and processors involved do not fail. This can add even more processing required, as redundancy may be added to both the sensors and the processors. In the case of redundant sensors, a high volume of data now must be fed to a processor from multiple sensors, each of which may be outputting a high volume of real-time data. In the case of redundant processing, the high volume of real-time data needs to be copied and delivered to multiple processors.

SUMMARY

An example system includes input interfaces configured to receive items of input data of different types, respectively; output interfaces, each of a different type; an interconnect coupled to the input interfaces and to the output interfaces; and a multichip hub coupled to the interconnect, to the input interfaces and to the output interfaces. The multichip hub includes a first buffer and a second buffer. The first buffer is configured to receive items of input data of a first type from at least a first input interface of the input interfaces, and the second buffer is configured to receive items of input data of a second type from at least a second input interface of the input interfaces. The multichip hub further includes a memory including context memory blocks, each having a different context; and a data movement engine coupled to the output interfaces. The data movement engine includes a context mapper coupled to the first and second buffers. The context mapper is configured to determine a context of each item of input data received and provide the item of input data to the context memory block of the context memory blocks corresponding to the context of the item of input data. Multiple processing blocks are provided within the multi-chip hub. Each processing block is configured to perform a respective processing operation, in which the data movement engine is configured to receive context configuration data to determine, for each item of input data received, which of the multiple processing operations are to be applied to the item of input data.

Another example system includes a processor; a circuit including different input interfaces, and different output interfaces; and a storage medium storing instructions executable by the processor. Executing the instructions causes a first input interface of the different input interfaces to receive a first item of data, and a second input interface of the different input interfaces to receive a second item of data; the circuit to route the first item of data to a first buffer of the circuit, and to route the second item of data to a second buffer of the circuit; a context mapper of the circuit to determine a context of each of the first and second items of data, provide the first item of data to a first context memory block, the context of which corresponds to the context of the first item of data, and provide the second item of data to a second context memory block, the context of which corresponds to the context of the second item of data; the circuit to perform a first set of one or more processing operations on the first item of data to create a processed first item of data, and perform a second set of one or processing operations on the second item of data to create a processed second item of data; and the circuit to provide the processed first item of data to a first output interface of the different output interfaces, and provide the second item of data to a second output interface of the different output interfaces.

BRIEF DESCRIPTION OF THE DRAWINGS

Embodiments of the present technology will be described and explained through the use of the accompanying drawings in which.

Figure 1:
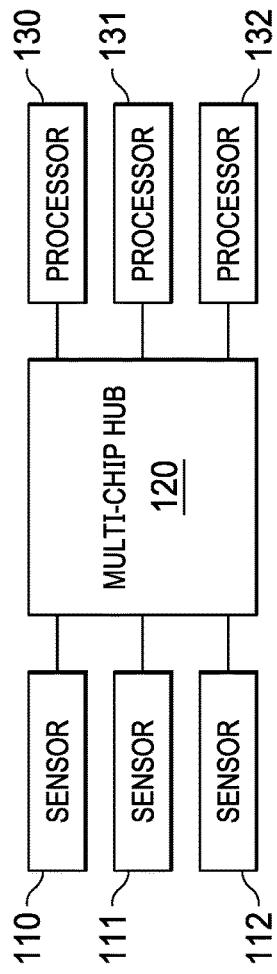
FIG. 1 is a block diagram of an implementation.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Technology is disclosed herein that improves the functioning of communication in sensing networks. In particular, a hub system is described that allows connection of multiple sensing devices and multiple processing devices in an efficient, flexible and transparent manner. As a result, multiple sensing devices, including both real-time and non-real-time devices, can be efficiently routed to processing systems in a way that allows for high processing power and/or fail-safe processes.

In various implementations, this disclosure describes a hub that allows the data from each of the sensors to be communicated efficiently to multiple processing systems in order to effectively drive the car in real-time.

The implementations may be capable of interacting with existing sensors and processing systems transparently. For example, a camera sensor that is providing real-time sensor output, can provide the sensor output, unaware that the multi-chip hub is receiving the data, reformatting and copying the data prior to providing the data to multiple processors for redundant processing. It may appear the same to the camera and each of the processors as if the sensor output is provided directly to a single processor. The multi-chip hub is able to process data according to rules, and may handle different types of data or data from different types of sensors differently. The multi-chip hub can improve the efficiency of the multi-chip sensor system, allowing for improved processing.

Referring now to the drawings, FIG. 1 shows a multi-chip hub 120 in an operational scenario. Sensors 110-112 are various sensors connected to multi-chip hub 120. While FIG. 1 depicts 3 sensors, 110-112, any number of sensors may be used. This is generally true with regard to each of the drawings in this application. The application is not limited to the specific number of elements included in the drawings or in the description. Redundant elements can be removed and additional redundant elements can be added without changing the meaning of the disclosure. Further, sensors 110-112 may be the same type of sensor, or varied sensors. For example, sensor 110 may depict a camera recording video. In various implementations, this video may be recorded at a low resolution or high resolution, and at a low or high frame rate. For example, sensor 110 may be a camera recording video at 2 megapixels and 120 frames per second. Sensor 111 may be a different sensor, such as a radar sensor. Sensor 112 may be yet another sensor, such as a lidar sensor. Sensors 111 and 112, acting as a radar sensor and a lidar sensor may record data at a high fidelity or a low fidelity, at a long distance or a short distance. In various alternative implementations, the sensors 110-112 may include pressure sensors, light sensors, audio sensors, ultrasound sensors, flow sensors, contact sensors, temperature sensors, capacitive sensors, voltage sensors, photoelectric sensors, rotation sensors, radioactivity sensors, acceleration sensors, current sensors, humidity sensors, moisture sensors, smoke sensors, visibility sensors, GPS sensors, or magnetic sensors, among others. Each of these sensors 110-112 may provide raw data or may include some degree of processing or preprocessing to the data output.

Each of sensors 110-112 provides data to the multi-chip hub 120. The data may be provided in any known format. In an implementation, sensor 110, acting as a camera recording video, may provide data according to a Camera Serial Interface (CSI). Other sensors may provide data as ethernet encapsulated data or Controller Area Network (CAN) data, by way of example. Any format that is commonly known could be used for delivery of data from the sensors 110-112 to the multi-chip hub 120.

In an implementation, multi-chip hub 120 is embodied on a System On a Chip (SOC). The SOC may be a generic SOC, comprising a processor, memory, and input/output ports. Alternatively, the SOC may be a specialized system incorporating additional specialized hardware elements that facilitate the activities of the multi-chip hub 120, as will be discussed in more detail below.

Multi-chip hub 120 provides the data from the sensors 110-112 to processors 130-132. In an implementation, processors 130-132 may be SOCs. Alternatively, processors 130-132 may be dedicated signal processing devices, or general purpose processors. While FIG. 1 shows 3 processors 130-132, in implementations, the multi-chip hub 120 may provide sensor data to any number of processors 130-132. Processors 130-132 may be configured to act redundantly, for instance to duplicate processing in the case of a failure. Processors 130-132 may be configured to operate collaboratively. By way of example, Processor 130 may be configured to handle processing of signals originating from camera sensors such as sensor 110, processor 131 may be configured to handle processing of signals originating from lidar sensors such as sensor 111, and processor 132 may be configured to handle processing of signals originating from radar sensors, such as sensor 112. In an implementation, processors 130-132 may be configured to operate cooperatively with data distributed among processors 130-132 such that none of processors 130-132 becomes overloaded. Alternatively, the processors 130-132 may operate cooperatively with real-time data processed by processor 130 and non-real-time data processed by processor 131. The operation of multi-chip hub 120 can be adjusted so that data is delivered to processors 130-132 such that processors 130-132 can operate redundantly or cooperatively as needed. For, multiple processors 130-132 may receive the same data, with each of processors 130-132 operating independently on the data, including performing differing functions or the same function redundantly, such as for fault handling purposes. This is not meant to be an exhaustive list of how processors 130-132 can operate together, but is merely a few examples.

The data from the sensors 110-112 may be provided to processors 130-132 in raw form, or in some type of processed form. In an implementation, the data from sensor 110 may be aggregated within multi-chip hub 120 until a given amount of data has been gathered, at which point the data may be transferred to one or more of processors 130-132. Alternatively, the data can be segmented if the data block received is larger than desired. This can serve to match the data delivery with any number of various processing or delivery needs, such as latency needs of processors 130-132, PCIe packet size or burst size to increase processing efficiency or facilitate on-the-fly data compression. Multi-chip hub 120 can provide the data to processors 130-132 in any format. In an implementation, the data is provided over a memory-mapped communication link such as PCIe or Hyperlink, for example.

Figure 2:
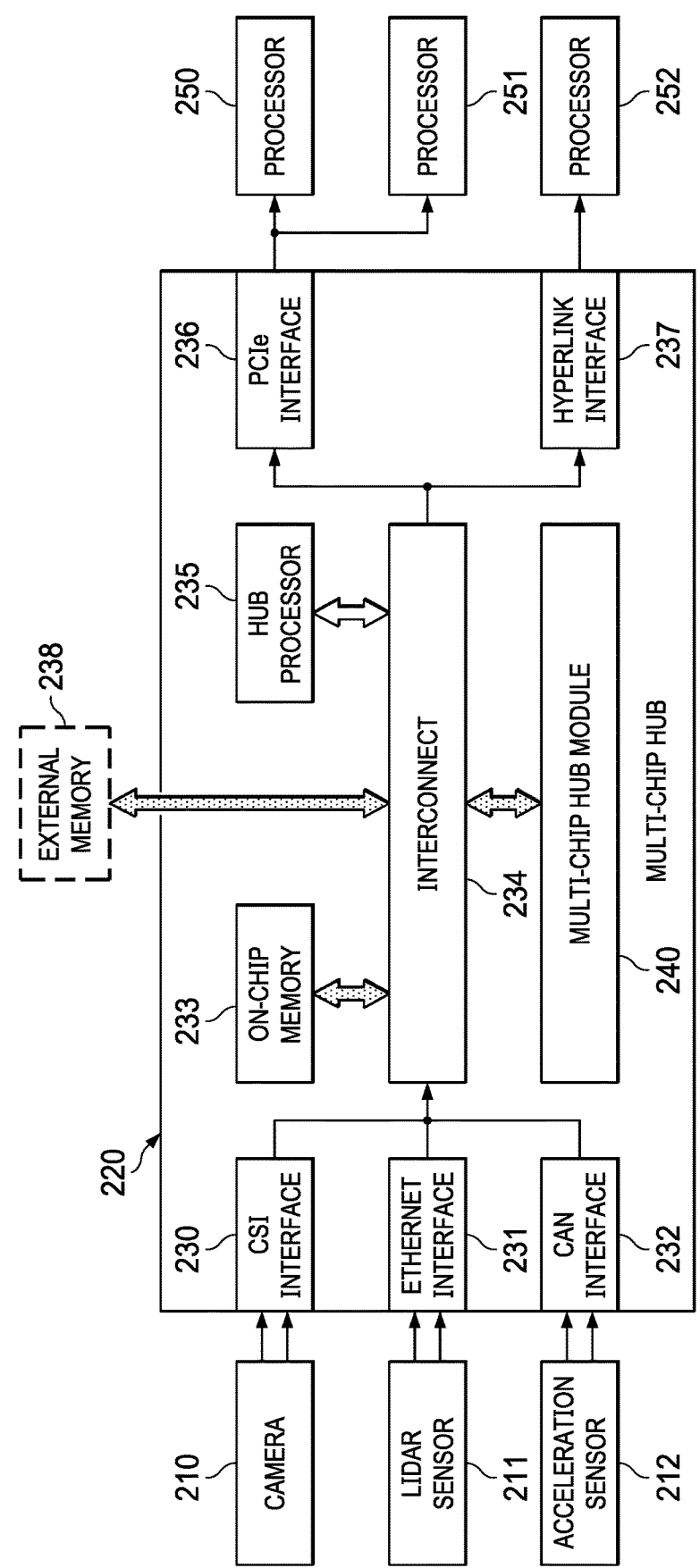
FIG. 2 is a block diagram of an implementation.

FIG. 2 depicts an internal block diagram of an implementation of multi-chip hub 220. Camera 210, lidar sensor 211, and acceleration sensor 212 depict sensors utilized in a multi-chip sensor system. As discussed with regard to FIG. 1, each of sensors 210-212 may depict a variety of sensors. For the sake of discussion, an implementation will be described for FIG. 2, in which camera 210 is a camera, lidar sensor 211 is a lidar sensor and acceleration sensor 212 is an acceleration sensor. Each of camera 210, lidar sensor 211, and acceleration sensor 212 provides sensor data to the multi-chip hub 220.

CSI interface 230, Ethernet interface 231 and CAN interface 232 are in multi-chip hub 220. Multi-chip hub 220 may additionally or alternatively include any number of other different sensor interfaces. Again, for the sake of discussion, in an implementation, CSI interface 230 is a Camera Serial Interface (CSI). Thus, camera 210, provides continuous real-time video data to multi-chip hub 220 through CSI interface 230. Continuous, real-time is not meant to signify that there can never be a break or lag in the data provided by camera 210. Rather, continuous and real-time are both meant to signify importance and time criticality to the multi-chip processing system. Thus, since in an implementation, the data from camera 210 is very important to the multi-chip sensor system, and it is important that the data be processed very quickly, this data is said to be continuous, real-time data. Similarly, lidar sensor 211 provides data to ethernet interface 231. Depending on the function of lidar sensor 211, the data it provides may be considered real-time or non-real-time data. Further, acceleration sensor 212 provides data to CAN interface 232. In an implementation, the data provided by the acceleration sensor is considered to be non-real-time data. In an implementation, each of CSI interface 230, ethernet interface 231 and CAN interface 232 may be configured to operate as a Direct Memory Access (DMA) slave port. In this way, multi-chip hub 220 can operate seamlessly with sensors designed for a DMA system. Each of CSI interface 230, ethernet interface 231 and CAN interface 232 connect to interconnect 234 in multi-chip hub 220.

Interconnect 234 is further connected to on-chip memory 233, external memory 238 and processor 235. In an implementation, each of on-chip memory 233, external memory 238 and hub processor 235 can be generic to an SOC. On-chip memory 233 and/or external memory 238 may be configured to provide temporary storage for data from camera 210, lidar sensor 211, and/or acceleration sensor 212 in the functionality of multi-chip hub 220. Hub processor 235 provides processing for configuring hub module 240 to carry out some or all of the functionality of multi-chip hub 220 through control path configuration. In an implementation, Hub processor 235 provides processing to carry out some or all of the functionality of multi-chip hub 220.

Additionally, multi-chip hub module 240 is connected to interconnect 234. Multi-chip hub module 240 can be a control module for the multi-chip hub functionality. In an implementation, multi-chip hub module 240 can additionally include hardware, firmware or software that is specialized to perform, as well as control, multi-chip hub functionality.

Further, interconnect 234 is connected to PCIe interface 236 and Hyperlink interface 237. PCIe interface 236 is connected to processors 250-251, and Hyperlink interface 237 is connected to processor 252. As discussed above, multi-chip hub may contain additional or alternative output interfaces which have not been shown. Each of PCIe interface 236 and Hyperlink interface 237 can be configured to operate as a DMA master port. Multi-chip hub can then be transparent to processors 250-252, which can operate as if connected directly to DMA slave sensors.

Figure 3:
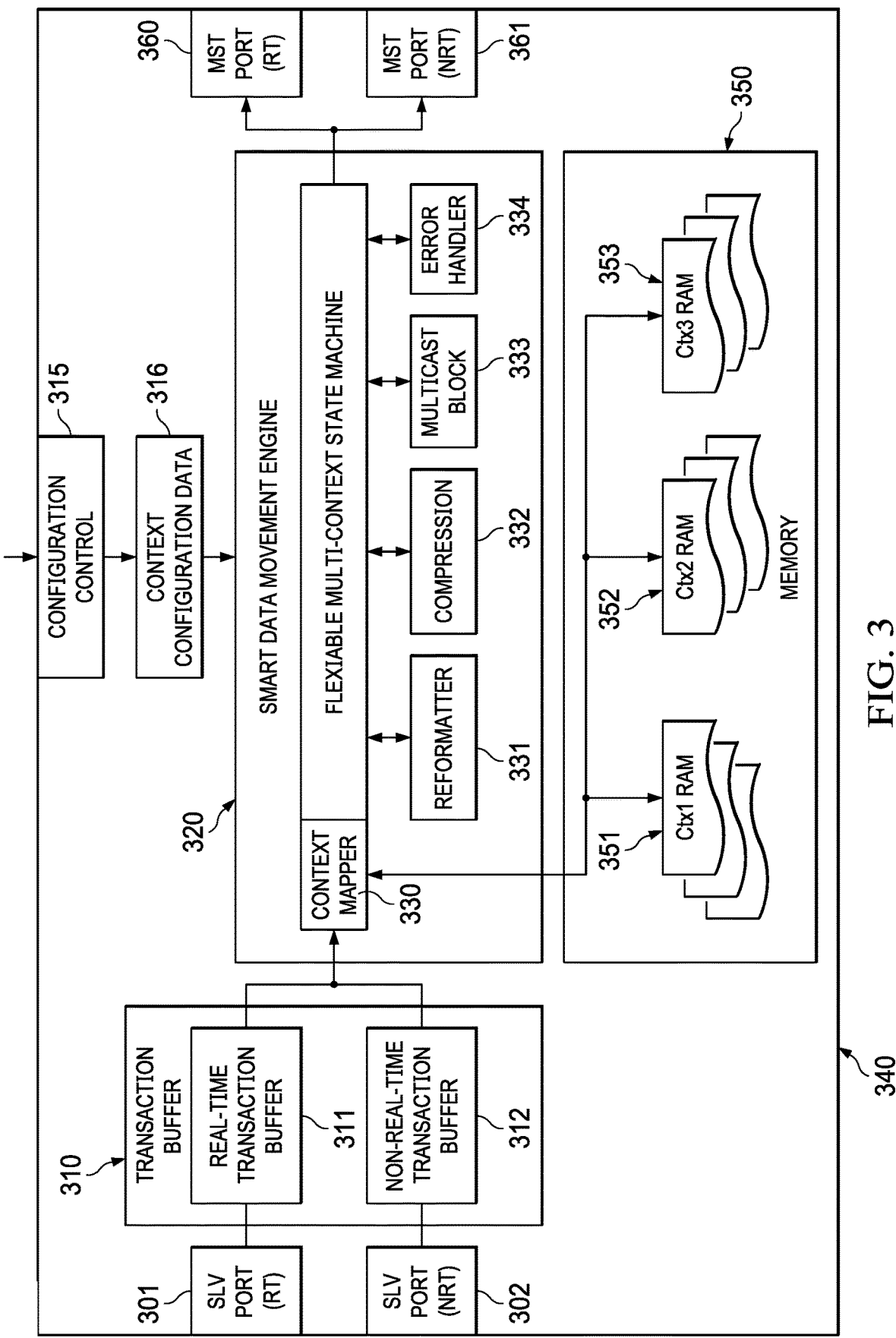
FIG. 3 is a functional diagram of an implementation.
Figure 4:
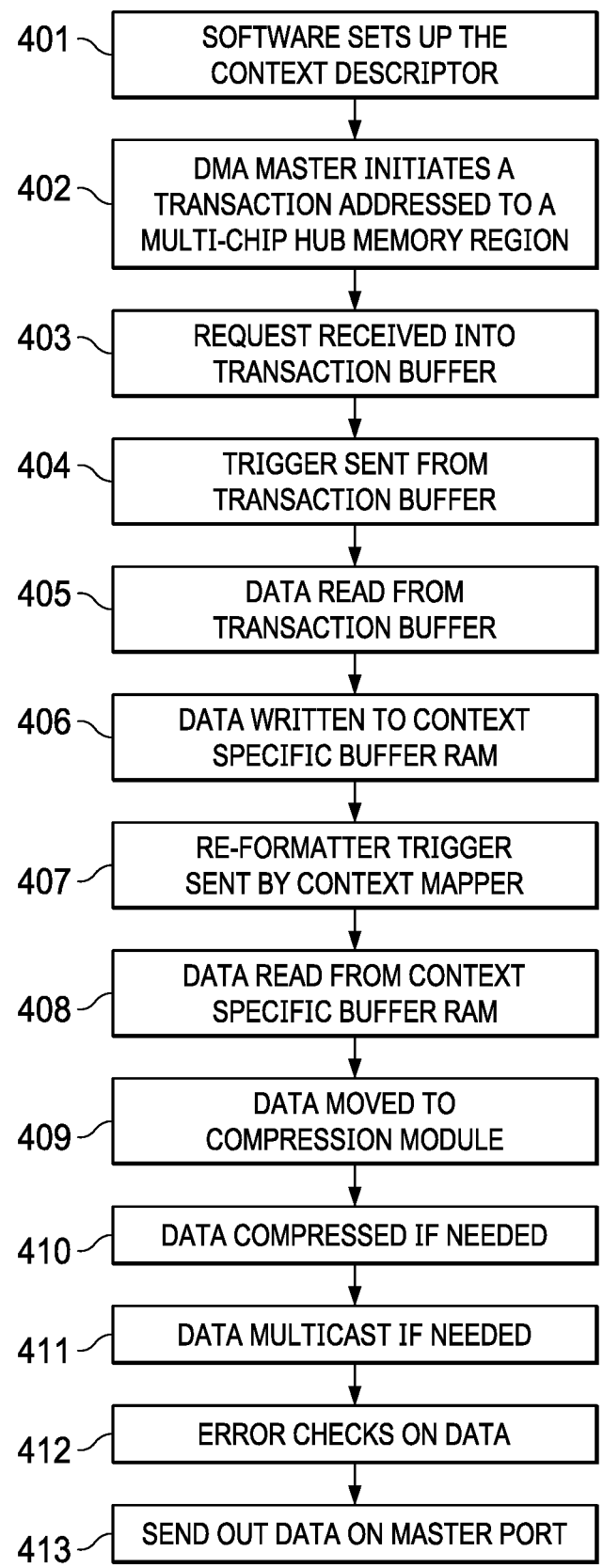
FIG. 4 is an operational sequence of an implementation.

FIG. 3 depicts a functional diagram according to an implementation of multi-chip hub module 340. Configuration input 315 is shown within multi-chip hub module 340. In implementations, configuration input 315 may have a user interface that allows a user to fill in information in context definition data 316. This could be done directly, by a user making individual selections, or indirectly, by a user creating rules to fill in the information in context definition data 316, which will be discussed in more detail with regard to FIG. 6. In implementations, configuration input 315 may not actually be an input, as it may be controlled by firmware or software within multi-chip hub module 340, such that multi-chip hub module automatically fills in context definition data 316. Context definition data 316 could be filled in based on the elements connected to multi-chip hub, for example.

Context definition data 316 is used to control the functionality of multi-chip hub module 340 as data is handled by multi-chip hub module 340. In particular, context definition data 316 is used by smart data movement engine 320 to determine which processing blocks are applied to individual data that is received from sensors.

Real-time input 301 and non-real-time input 302 are shown within multi-chip hub module 340. In an implementation, real-time input 301 corresponds to one or more of CSI interface 230, ethernet interface 231 and CAN interface 232 in FIG. 2. For instance, if camera 210 and lidar sensor 211 from FIG. 2 are interpreted to provide real-time data, real-time input 301 may correspond to both CSI interface 230 and ethernet interface 231. Non-real-time input 302 may then correlate to CAN interface 232. Essentially, FIG. 3 is depicting that the interfaces are divided into real-time and non-real-time inputs. In an implementation, one ethernet interface my provide real-time data, while another ethernet interface may provide non-real-time data, for example. Alternatively, the input interfaces could be divided into more categories—for example, high priority, medium priority, and low priority.

The real-time input 301 and non-real-time input 302 each feed data into the transaction buffer 310. Real-time transaction buffer 311 and non-real-time transaction buffer 312 are located within transaction buffer 310. Data from the real-time input 301 proceeds into the real-time transaction buffer 311, and data from the non-real-time input 302 proceeds into the non-real-time transaction buffer 312. Each of the real-time transaction buffer 311 and non-real-time transaction buffer 312 may be implemented as First In First Out (FIFO) buffers.

Data from the transaction buffer 310 is transferred to the smart data movement engine 320. Since the real-time data is separated from the non-real-time data in separate buffers, the real-time data can be given priority in processing by the smart data movement engine 320. When data from the transaction buffer 310 is moved into the smart data movement engine 320, it is initially processed by the context mapper 330. Context mapper 330 receives the data from the transaction buffer and determines the context of the data. In an implementation, the context of the data describes which sensor originated the data. The context definition data 316 describes how data of each context should be handled. Included in the context definition data 316 is an indication of where data of each context should be stored in memory 350. Context memory blocks 351-353 can correlate to different contexts. For example, data corresponding to context 1 may be assigned (by the context definition data 316) to context memory block 351. Context 2 and context 3 may respectively correspond to context memory blocks 352 and 353. In an implementation, memory 350 is embedded memory in the multi-chip hub module 340, which is implemented on an integrated circuit. Context memory block 351-353 are allocated when setting up a context through configuration input 315. Context memory blocks 351-353 provide working area for managing in-flight operations for the assigned context.

Context definition data 316 also includes description of which processing blocks of smart data movement engine should be applied to a given context of data. For example, context 1 data may be assigned to be processed through each of re-formatter module 331, compression module 332, multicast block 333 and error handler 334. Context 2 data may only be assigned to pass through re-formatter module 331 and error handler 334.

Following processing through the smart data movement engine 320, the contextual data is sent to the processors through real-time output 360 or non-real-time output 361. The smart data movement engine 320 sends the data to the appropriate output based on the context and the context definition data 316. As was described above with regard to the real-time input 301 and non-real-time input 302, the real-time output 360 and non-real-time output 361 may each correspond to multiple outputs, and/or multiple formats. Similarly, the real-time output 360 and non-real-time output 361 may both provide output to a single processor, (or may both provide output to the same three processors, for example), or the real-time output 360 and non-real-time output 361 may be divided and provided to separate processors.

Multi-chip hub module 340, as a whole, presents a target memory address space for direct memory addressing (DMA) from sensors attached to real-time input 301 and non-real-time input 302. In an implementation, this target memory address space is virtual, with no physical memory allocation. This target memory address space provides a proxy address as a target for transactions from the sensor. This target memory address space can be defined in configuration definition data 316, along with further partitioning of the space into per-context virtual memory regions. When a transaction enters the multi-chip hub 340, it will be addressed to a destination address. Context mapper 330 uses the destination address to find a matching target memory address in the configuration definition data 316. This target memory address corresponds to one of the per-context virtual memory regions, and consequently, to one of the defined contexts. In an implementation, memory 350 is a physical memory which is used as a work area to hold data for in-flight transactions as they are processed through the functional blocks in smart data movement engine 320. Memory 350 can be partitioned into multiple context specific memory blocks, such as context memory blocks 351-353, and managed by context mapper 330. The output can also be defined in context definition data 316. For example, the output address may be defined as a linear address translation from the input address space and available output address space. The output address space may be a memory mapped region in PCIe or hyperlink address space.

As will be described with reference back to FIG. 3. In step 401, Software sets up the context descriptor. Configuration input 315 can take input from an outside source, such as a user interface, or from automated software to set up context definition data 316. This data can include entries for each context that will be processed through smart data movement engine 320. For example, context definition data 316 can include a memory location 351-353 for the context. Context definition data 316 can further include indications as to whether data of a certain context will be processed through re-formatter module 331, compression module 332, multi-cast block 333, and/or error handler 334. Context definition data 316 can further inform what type of reformatting or compression might be performed, or how many streams should be multi-cast, where to save the multi-cast data, data thresholds for the context memory blocks 351-353, etc.

In step 402, a DMA master initiates a transaction addressed to a multi-chip hub memory region. In an implementation, the DMA master may correlate with one of the processors connected to the real-time output 360 or the non-real-time output 361. As the multi-chip hub module 340 is transparent to the processors, the processors can directly act as a DMA master as request data from one of the sensors. Alternatively, the multi-chip hub module may act as the DMA master, requesting data from the sensors. Multiple DMA masters can concurrently read/write through the real-time input 301 and non-real-time input 302. In either scenario, data is transferred from one or more of the sensors attached to the real-time input 301 or non-real-time input 302.

When the data is received in response to the DMA master initiated transaction, it is received into the transaction buffer 310. If the data comes from a real-time source, it will be received into the real-time transaction buffer 311. If the data comes from a non-real-time source, it will be received into the non-real-time transaction buffer 312. In an implementation, the transaction buffer 310 is stored in Random Access Memory (RAM) in small amounts, which allows for fast, on the fly processing. This can be realized as fast local access FIFO memory, for example.

In step 404, after the data is received into the transaction buffer 310, a trigger is sent from the transaction buffer 310 to the context mapper 330. Context mapper 330 then reads the data from the transaction buffer in step 405. If context mapper receives multiple triggers indicating that both real-time data and non-real-time needs to be read, context mapper can prioritize the real-time data by reading initially from the real-time transaction buffer 311. In this way, non-real-time data will not prevent real-time data from moving through the multi-chip hub 340. Each of the real-time transaction buffer and the non-real-time transaction buffer are FIFO buffers, such that context mapper 330 can read all of the available data from the real-time transaction buffer before reading the available data from the non-real-time transaction buffer.

Context mapper 330 then writes the data to the appropriate context memory block 351-353 in step 406. Context memory blocks 351-353 are defined in context definition data. In an implementation, context memory blocks are RAM, allowing for fast, on the fly processing. For example, these may be embedded local memories within multi-chip hub module 340 on an integrated circuit, this can avoid the need to store the data in long-term memory at all, creating significant time savings for on-the-fly data movement and processing. Context mapper 330 implements logic for the context memory blocks 351-353, such as occupancy and wrap-around rules. Further, context mapper 330 can manage the context memory blocks 351-353, and identify when the threshold defined in the context definition data 316 has been met.

In step 407, context mapper 330 sends a trigger to the re-formatter module 331 when the threshold is met. Re-formatter module 331 reads the data (step 408) from the context memory blocks 351-353. In an implementation, re-formatter reformats the data by accumulating the data into efficient blocks of data. By way of example, the threshold size may be selected based on efficient sized frames for compression (256 bytes, 512 bytes, 1024 bytes). This can make compression more efficient. The threshold can also serve to reduce latency, as the multi-chip hub can forward small blocks of data rather than needing to wait, for example, for a full video frame to be complete (approximately 2 megabytes of data). For example, the threshold can be selected so that downstream PCIe or Hyperlink transfers are more efficient based on the packet size and/or data burst size.

In step 409, the re-formatter module 331 forwards the data to the compression module 332. The data may move to a context-specific FIFO buffer for the compression module 332, or it may proceed directly to the compression module 332. In the context definition data 316, some contexts are not indicated to need compression. In that case, the data may proceed through the compression module 332 without performing any compression, or the data may bypass the compression module 332.

Following the compression module 332, in step 411, the data is multicast if needed. The data can enter a context-specific FIFO buffer or proceed directly to the multicast block 333. The context definition data 316 can define whether multicast is necessary for the particular context, how many copies are needed, and where the copies should be stored. If no multicast is necessary, the multicast block 333 can be bypassed. Each of the data streams from the multicast block 333 can enter a context specific FIFO buffer for the Error handler.

In step 12, error handler 334 verifies the data, and confirms that the data has been timely provided. Error handler 334, for example, handles transport completion and acknowledgements from processors connected to real-time output 360 or the non-real-time output 361 as transactions are output over PCIe and/or Hyperlink interfaces. The data then enters a real-time or non-real time FIFO buffer for the master port. The master port can correlate with one of the PCIe interface 236 or Hyperlink interface 237 from FIG. 2 described above.

Figure 5:
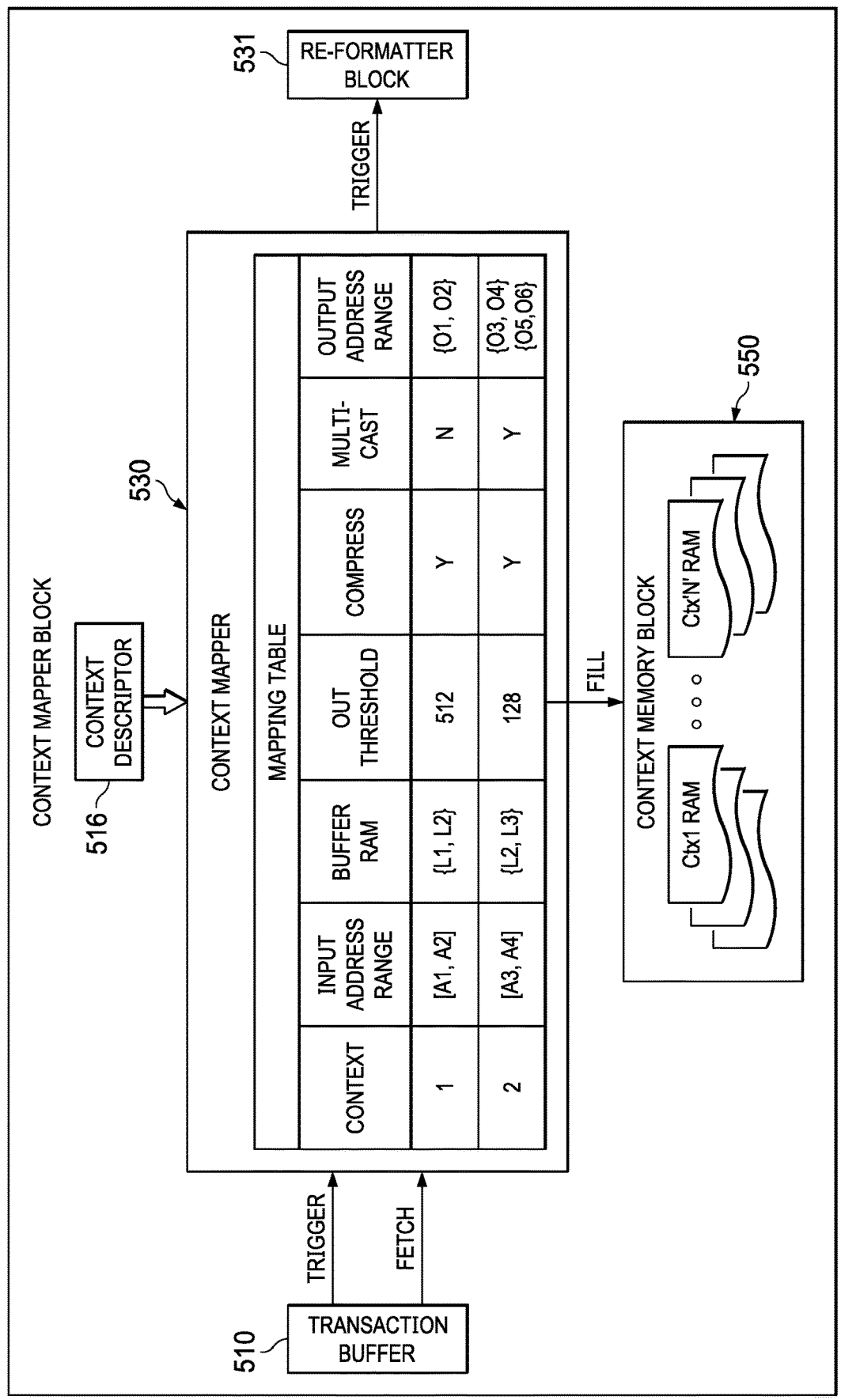
FIG. 5 is a block diagram of an implementation.

FIG. 5 shows context mapper 530 in more detail. Data from one or more of the sensors enters the transaction buffer 510. Transaction buffer 510 sends a trigger to context mapper 530 to indicate that data has arrived in transaction buffer 510. The data in the transaction buffer 510 may include sensor data as well as information related to the sensor data, such as command data, address data, attribute data, etc. Context mapper 530 reads the data from transaction buffer 510. Context mapper 530 also has access to context definition data 516, which may be in the form of a lookup table. In FIG. 5, context mapper 530 shows the information from context definition data 516 as a lookup table which context mapper 530 uses with the data from transaction buffer 510. By comparing the transaction address against the information encoded in the lookup table, context mapper 530 assigns a context to the data. As seen in context mapper 530, context definition data 516 can include information such as context ID, input address range, context memory block location, threshold, compression flag, multicast flag and output address range. For example, Context ID may be derived by comparing the incoming request destination address to the per-context input address ranges encoded in the context definition data 516. The address range is used to identify a corresponding context ID. The input address can be a region inside the multi-chip hub address space. On the output side, the output can be a PCIe or Hyperlink address space matching the output interface (such as real-time output 360 or the non-real-time output 361). Context definition data 516 can hold the association between input addresses and output address for the transaction. Context definition data 516 can also contain further information relevant to the context.

Context mapper 530 coordinates movement between the various sub-blocks of smart data movement engine 320, such as re-formatter 331, compression module 332, multicast block 333 and error handler 334. The context definition data 516 can include context-specific information about each of the sub-blocks. After context mapper 530 reads the data from the transaction buffer 510, context mapper 530 fills data to the context memory block 550 and sends a trigger to re-formatter module 531.

Figure 6:
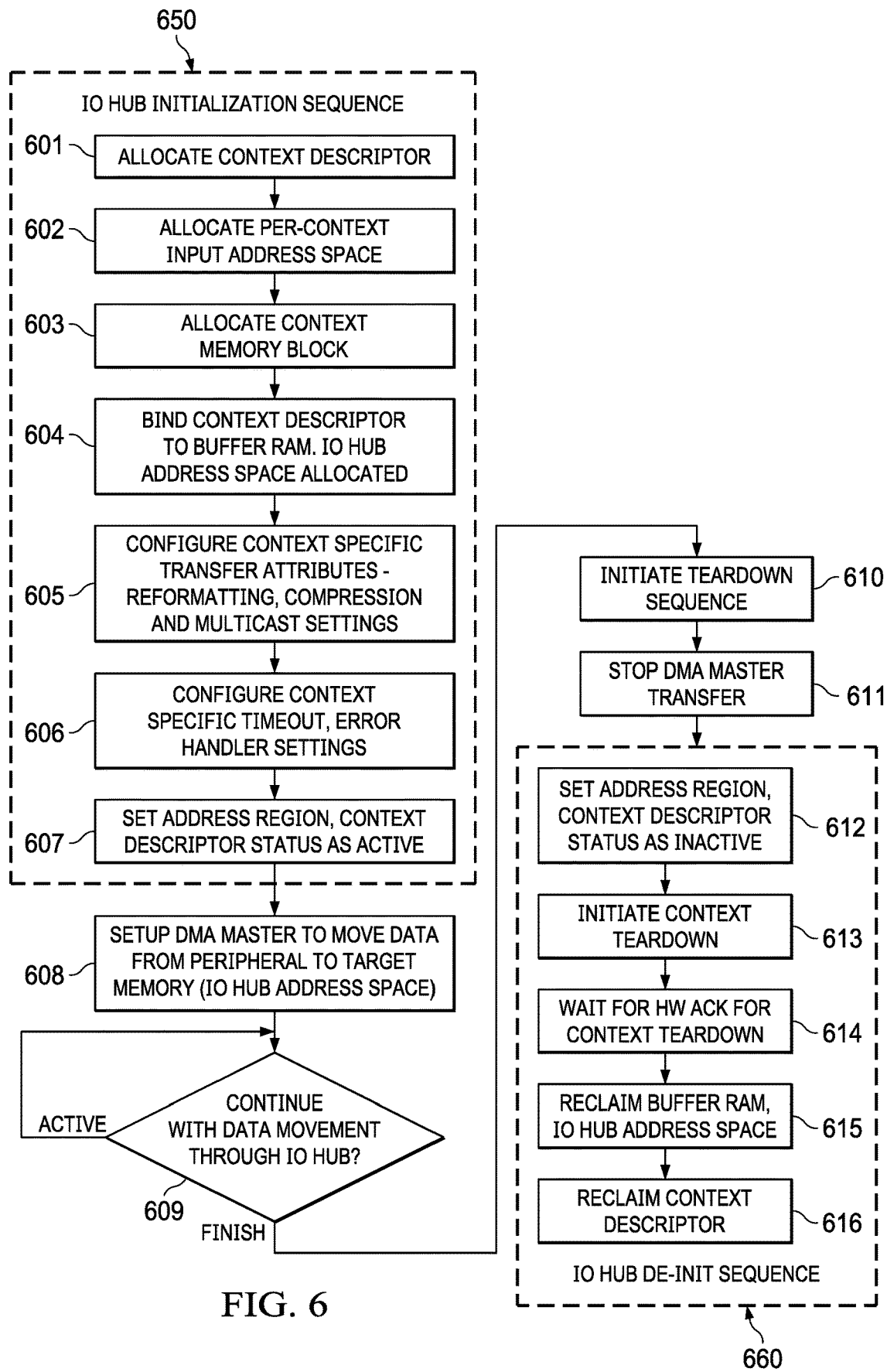
FIG. 6 is an operational sequence in an implementation.

FIG. 6 illustrates a method of operating a multi-chip hub in an implementation. The steps in hub initialization sequence 650 may be carried out with user input, such as through a user interface, or without user input. In step 1, a context descriptor is allocated. This context descriptor may be allocated for a given sensor, such as a camera that is attached to the multi-chip hub. The allocation may occur automatically as the sensor is attached to the multi-chip hub, or automatically as the system powers up, for example. Alternatively, a user may indicate that a sensor is attached to the multi-chip hub, and manually allocate the context descriptor, or trigger a context descriptor to be allocated.

In step 602, the multi-chip hub allocates per-context input address space. A portion of the input address space is reserved for use by a particular context. The input address space can be entirely virtual, with no physical memory. The per-context input address space can then be used to identify which context is associated with each incoming transaction. The per-context input address space can be saved in the context configuration data 316 along with a correlation with the appropriate context descriptor.

The context memory block is allocated in step 603. The context memory block can be used as a work area buffer for in-flight transactions on a per-context basis. This context memory block may be a section of RAM that is allocated for data associated with a specific context. In an implementation, this context memory block may be a portion of RAM memory built into an SOC integrated circuit that is allocated to a particular context, such as the data provided by a particular camera sensor. In step 604, the context descriptor is bound to the transaction buffer space and the context memory block. In an implementation, the context descriptor may be written to memory in the context memory block, for example. The context descriptor may further be written to a lookup table or similar.

Specific transfer attributes are configured next for the context in step 605. These attributes may include re-formatting options, such as buffer thresholds, compression settings, multi-cast settings, etc. As described above, these attributes may be configured automatically or with user intervention. Context specific error handling settings, such as timeout settings, are also configured for the context.

When all of the attributes of the context are defined, the context memory block and the context descriptor are set as active in step 607. At this point, the initialization sequence 650 is complete, and the multi-chip hub is ready to operate for that context. The initialization sequence 650 may need to be performed again for other contexts as well.

In step 608, the DMA master is set up to move data from the sensor, such as the camera discussed above, to the transaction buffer. From here, the data will move through the multi-chip hub as discussed above. This is shown in step 609. This step repeats until the teardown sequence begin sin step 610. This teardown sequence may be triggered by a user through a user interface, or may be automatically triggered, such as when certain thresholds have been met, or when a power-down sequence is begun.

In step 611, the DMA master is instructed to stop transfer of data. The context termination sequence 660 then proceeds. The context memory block is marked as inactive and the context descriptor is marked as inactive. The context teardown is initiated, and confirmed through hardware confirmation. In step 615 and 616, the transaction buffer, context memory block and context descriptor are all reclaimed. In an implementation, the transaction buffer may continue if other contexts continue to utilize the transaction buffer.

Figure 7:
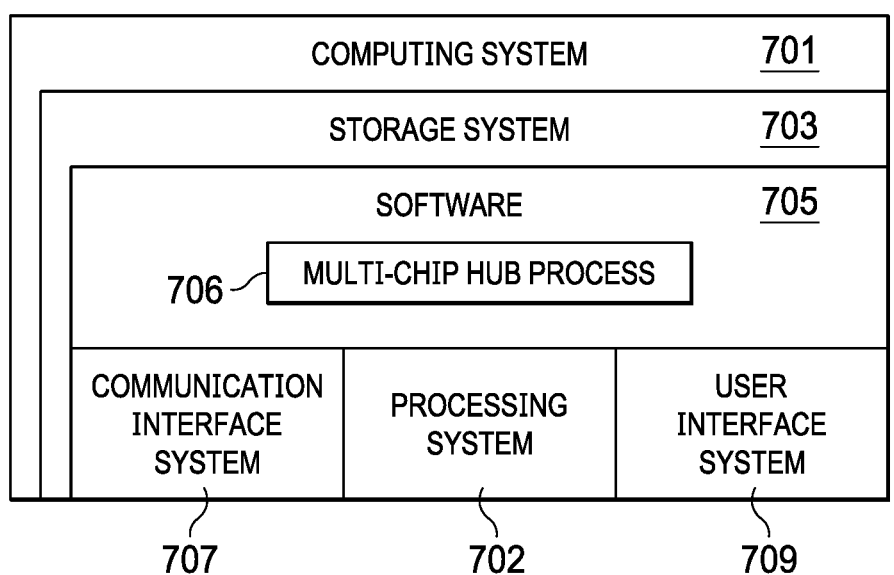
FIG. 7 is a functional view of a system suitable for implementing an implementation.

FIG. 7 illustrates computing system 701 that is representative of any system or collection of systems in which the various processes, programs, services, and scenarios disclosed herein may be implemented. Examples of computing system 701 include, but are not limited to, integrated circuits, SOCs, server computers, routers, web servers, cloud computing platforms, and data center equipment, as well as any other type of physical or virtual server machine, physical or virtual router, container, and any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements multi-chip hub process 706, which is representative of the multi-chip hub processes discussed with respect to the preceding Figures. When executed by processing system 702, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including multi-chip hub process 706) may be implemented in program instructions and among other functions may, when executed by processing system 702, direct processing system 702 to operate as described with respect to the various operational scenarios, sequences, and processes illustrated herein. For example, software 705 may include program instructions for implementing a connection process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system customized to establish connections and handle content as described herein. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A system comprising:
   input interfaces configured to receive items of input data of different types, respectively;
   output interfaces, each of a different type;
   an interconnect coupled to the input interfaces and to the output interfaces;
   a multichip hub coupled to the interconnect, to the input interfaces and to the output interfaces,
   the multichip hub including:
      a first buffer and a second buffer, the first buffer configured to receive items of input data of a first type from at least a first input interface of the input interfaces, and the second buffer configured to receive items of input data of a second type from at least a second input interface of the input interfaces;
      a memory including context memory blocks, each having a different context; and
      a data movement engine coupled to the output interfaces, the data movement engine including
         a context mapper coupled to the first and second buffers, the context mapper configured to determine a context of each item of input data received and provide the item of input data to the context memory block of the context memory blocks corresponding to the context of the item of input data, and
         multiple processing blocks, each configured to perform a respective processing operation, the data movement engine configured to receive context configuration data to determine, for each item of input data received, which of the multiple processing operations are to be applied to the item of input data.

2. The system of claim 1, wherein the multiple processing blocks include a re-formatter block configured to perform as its respective processing operation a reformatting operation, a compression block configured to perform as its respective processing operation a compression operation, a multi-cast block configured to perform as its respective processing operation a multi-cast operation, and an error handling block configured to perform as its respective processing operation an error handling operation.

3. The system of claim 1, wherein:
   the first type of input data includes real-time data;
   the second type of input data includes non-real-time data;
   the first buffer includes a real-time buffer; and
   the second buffer includes a non-real-time buffer.

4. The system of claim 1, wherein the output interfaces include a peripheral component interconnect express (PCIe) output interface and a hyperlink interface.

5. The system of claim 3, wherein, to determine the context of each item of input data received from the first and second buffers, the context mapper is configured to determine which of the first or second input interface received the item of input data.

6. The system of claim 3, wherein the context mapper is further configured to receive a trigger for each item of input data received into the real-time and non-real-time buffers, and read each item of input data, the context mapper further configured to prioritize the reading of an item of input data from the real-time buffer over reading an item of input data from the non-real-time buffer.

7. The system of claim 6, wherein the context mapper is further configured to write each item of input data to the context memory block of the context memory blocks corresponding to the context of the item of input data in a determined priority order.

8. The system of claim 1, wherein the context configuration data includes thresholds for the context memory blocks, the context mapper further configured to determine when the thresholds have been met.

9. The system of claim 1, wherein the context mapper includes a mapping table to represent the context configuration data.

10. The system of claim 1, the first input interface includes a camera serial interface (CSI), the second interface includes an ethernet interface, and the input interfaces further includes a controller area network (CAN) interface.

11. A system comprising:
   a processor;
   a circuit including different input interfaces, and different output interfaces; and
   a storage medium storing instructions that, when executed by the processor, cause:
      a first input interface of the different input interfaces to receive a first item of data, and a second input interface of the different input interfaces to receive a second item of data;
      the circuit to route the first item of data to a first buffer of the circuit, and to route the second item of data to a second buffer of the circuit;
      a context mapper of the circuit to determine a context of each of the first and second items of data, provide the first item of data to a first context memory block, the context of which corresponds to the context of the first item of data, and provide the second item of data to a second context memory block, the context of which corresponds to the context of the second item of data;
      the circuit to perform a first set of one or more processing operations on the first item of data to create a processed first item of data, and perform a second set of one or processing operations on the second item of data to create a processed second item of data; and
      the circuit to provide the processed first item of data to a first output interface of the different output interfaces, and provide the second item of data to a second output interface of the different output interfaces.

12. The system of claim 11, wherein the instructions, when executed by the processor, cause the circuit to select each of the first and second set of one or more processing operations from a group of processing operations including a reformatting, compression, multi-casting, and error-handling.

13. The system of claim 11, wherein:
the first input interface includes a real-time interface and the first item of data includes real-time data;
the second input interface includes a non-real-time interface and the second item of data includes non-real-time data;
the first buffer includes a real-time buffer; and
the second buffer includes a non-real-time buffer.

14. The system of claim 13, wherein the instructions, when executed by the processor, cause the context mapper to delay providing the second item of data to the second context memory block until after the first item of data has been provided to the first context memory block.

15. The system of claim 13, wherein the instructions, when executed by the processor, cause the context mapper to determine a priority order in which each item of data including the first and second items of data is to be provided to a corresponding context memory block of multiple context memory blocks including the first and second context memory blocks.

16. The system of claim 11, wherein the instructions, when executed by the processor, cause the circuit to perform each of the first and second sets of one or more processing operations based on context configuration data.

17. The system of claim 16, wherein the instructions, when executed by the processor, cause the context mapper to represent the context configuration data in a mapping table.

18. The system of claim 11, wherein:
the circuit includes a data movement engine that includes the context mapper and processing blocks for performing processing operations; and
the instructions, when executed by the processor, cause the circuit to select one or more of the processing blocks for performing each of the first and second sets of one or more processing operations.

19. The system of claim 18, wherein the circuit includes a transaction buffer that includes the first and second buffers; and a memory that includes the processing blocks.

* * * * *